United States Patent Office 2,795,626
Patented June 11, 1957

2,795,626

PROCESS FOR ORGANO-METALLIC DERIVATIVES

John F. Nobis, Cincinnati, Ohio, and Robert E. Robinson, Ludlow, Ky., assignors to National Distillers and Chemical Corporation, New York, N. Y., a corporation of Virginia No Drawing. Application April 14, 1954,
Serial No. 423,208

12 Claims. (Cl. 260—665)

This invention generally relates to a novel process for preparation of halo-magnesio organic compounds, and more specifically, it relates to the selective production of Grignard reagents from organic sodium compounds by a new and heretofore unknown method. More particularly, the novel process includes improvements in the preparation of the Grignard reagents wherein organic sodium compounds, either as initial reactants or prepared in situ, are converted to the corresponding halo-magnesio organic compounds. These Grignard reagents can be further reacted to yield highly valuable, related products.

It has been known to make Grignard reagents of the general type, RMgX, in which R is an organo radical and X is a halogen atom which may be either chloride, bromide, or iodide. These organomagnesium compounds are most commonly prepared by reaction of the corresponding RX compound with metallic magnesium in dry ether medium, such as diethyl ether. It is usually not necessary to isolate the resulting Grignard reagent and it is prepared and directly reacted with a suitable reactant as desired.

It is also well known that the activity of organometallic compounds varies considerably depending upon the type of organic radical and the particular metal involved. These differences in reactivity are by no means regular; however, it has been shown that, in general, organosodium compounds possess considerably more reactivity than the corresponding Grignard reagents.

Although the Grignard reagents are extremely convenient for carrying out organic synthetic reactions, their usual method of preparation suffers from a number of disadvantages which are overcome by this process. By this method it is possible to form an organometallic compound readily through the use of sodium in a hydrocarbon diluent, and then convert to a Grignard reagent for subsequent use in an ether diluent. This is an advantage particularly since some organic chlorides inherently react very slowly with metallic magnesium in ether and require a relatively long period of time for initiation and completion of the reaction. Frequently, catalytic materials must be added to initiate and accelerate the reaction. Furthermore, it is usually necessary to employ ethers as the reaction medium when using magnesium turnings and this restriction may somewhat limit the uses of the final reaction mixture containing the Grignard reagent. By this invention method, however, the Grignard reagent may be obtained in a hydrocarbon medium, if desired.

Another advantage is that by the use of this process, it is possible to effect metalation reactions of such compounds as aryl and heterocyclic compounds using aliphatic sodium compounds. Such reactions are impossible with Grignard reagents. These new sodium compounds can be converted to Grignard reagents which can in turn be conveniently reacted to form phenolic compounds or amines. In this way, certain synthetic reactions can be done which cannot be accomplished with other organosodium compounds or Grignard reagents used alone.

The process offers advantages from an economical standpoint. Ordinarily it is necessary to use expensive magnesium turnings to prepare Grignard reagents. Also, it is frequently necessary to use the organic bromide or the iodide in order to obtain satisfactory reactivity. On the other hand, this method does not require magnesium metal and it is in fact preferred to use the less expensive and more commonly available organic chlorides as the organic starting materials.

It is a further advantage that many of the organosodium compounds can be prepared in theoretical yields, and consequently can be converted to the corresponding Grignard reagents in theoretical yields.

There has now been discovered a novel and heretofore entirely unknown method for the ready and convenient preparation of these valuable chemical intermediates. This method does not employ metallic magnesium as a reagent. As the organic starting material, there may be employed either the organic sodium compounds, or preferably, these materials may be prepared in situ by the reaction of organic halogen compounds with metallic sodium. In either method, the organic sodium compounds are reacted with solid, anhydrous magnesium chloride to convert them directly to the Grignard reagents. It is further preferred to carry out the reaction using solid, anhydrous magnesium chloride in an attrition type of apparatus such as a ball mill or a pebble mill.

One object of this invention is to provide a new, convenient, and practical method for preparing organo halomagnesium compounds.

A second object of the invention is to prepare Grignard reagents from organosodium compounds using magnesium chloride and without the use of metallic magnesium as a reactant.

Another object is to prepare Grignard reagents employing as initial starting materials organic halides, sodium, and solid, anhydrous magnesium chloride, and obtaining in high yields the organo halomagnesium compounds, with high utilization of all reactants.

Another and more specific object is to provide a novel and highly effective method for manufacture and utilization of Grignard reagents by the simultaneous reaction of organic halides, metallic sodium, and solid, anhydrous magnesium chloride in an attrition type of apparatus, at the same time employing the solid magnesium chloride as the solid attrition agent in the initial reaction between the organic halide and the metallic sodium for increased utilization of the sodium.

Other objects will become apparent from the complete description of the invention which follows.

In carrying out the process of this invention several variations may be utilized. For example, an organic halide, such as the chloride, bromide, or iodide is reacted with metallic sodium which is in a finely dispersed form. It is much preferred to carry out the entire reaction in an inert diluent such as a hydrocarbon or other inert medium. By the term inert it is meant that the reaction medium is substantially unreactive toward the organosodium intermediate under the reaction conditions employed. Ethers are not necessary and should, in fact, be avoided. At the same period or after the organic sodium compound has formed, the reacting mixture is contacted with solid, anhydrous magnesium chloride. This magnesium chloride reacts readily and quantitatively with the organosodium compound to replace the sodium atom by an —MgCl group, thereby resulting in formation of a classical Grignard reagent. The reaction may also be carried out using preformed sodium organic compounds in reaction with the solid, anhydrous magnesium halide. It is further contemplated and the preferred procedure is that the entire reaction should be conducted in equipment capable of providing efficient grinding and mixing. This is most efficiently accomplished in attrition equipment such as a ball mill or pebble mill; and the entire reaction to make the Grignard reagents and react them further with other reagents may be done in such apparatus. Thus, the solid magnesium chloride not only functions as a convenient reactant but also functions during the reaction as a solid attrition agent, thereby giving increased utilization of the metallic sodium.

The organic halides which may be employed as starting materials for this novel process include any of the RX type in which R represents a monovalent organic radical of the alkyl, aryl, alkaryl, aralkyl, alkenyl, alkynyl, alicyclic, and heterocyclic types. The X may represent either a chloride, bromide or iodide atom. It is preferred to employ the chlorides from the standpoint of economy and ease and selectivity. Use of the chloride avoids formation of Wurtz type by-products. The X should be directly linked to a carbon atom. The reagents should be introduced into the reaction in an anhydrous state. Specific compounds which can be employed are methyl chloride, methyl bromide, methyl iodide, ethyl chloride, ethyl bromide, ethyl iodide, propyl chloride, isopropyl chloride, the butyl chlorides, butyl bromides, butyl iodides, the amyl chlorides, hexyl chloride, hexyl bromide, octyl chlorides, lauryl chlorides, cyclohexyl chloride, chlorobenzene, bromobenzene, chlorotoluenes, chloroxylenes, $\alpha$ and $\beta$-chloronaphthalene, chlorothiophenes, chlorofuran, and the like. The process is particularly useful for making higher molecular weight Grignard reagents not readily made by conventional means, such as aliphatic types in which R group has more than 10 carbons.

If the preformed organosodium compounds are used, then the coresponding compounds of those listed above are used, with substitution of the sodium atom for a halide atom bonded directly to a carbon atom. These organosodium compounds can be prepared by well known, usual reactions.

The diluents which can be employed should be inert to the reactants and intermediates formed during any part of the reaction. Thus, it is much preferred to operate in a reaction medium consisting substantially of hydrocarbons such as petroleum ether, heptane, octane, hexane, isooctane, benzene, toluene, xylenes, cyclohexane, and mixtures of such liquid solvents. It is of particular advantage in the process that it is not necessary to employ in any part of the operation an ether such as is essential in the usual preparations of Grignard reagents.

It is of advantage to start with the organohalo compounds and thus form the organosodium compound in situ during the course of the reaction. In order to do this, it is necessary that the sodium to be employed in the attrition apparatus should be initially, and should be maintained, in finely divided form. In general, this requires that sodium be in a finely dispersed state in an inert liquid reaction medium. A sodium dispersion in which the average particle size is less than 50 microns is quite satisfactory for carrying out the process, the preferred size range being 1 to 10 microns. This dispersion is made in an inert hydrocarbon, but not necessarily the same one as that used as the principal reaction medium. This dispersion is most conveniently, but not necessarily, made as a separate step preliminary to the reaction with the sodium and the magnesium chloride.

It has also been discovered that in carrying out reactions using metallic sodium, a surprising and unexpected increase in reaction rate and, in effect, an overall increase in the speed of the reaction, can be accomplished by the use of an appropriate attrition agent. These agents are particularly advantageous when employed in an attrition type reaction apparatus. For this use, they should be solid and should be friable. These agents have been found to give increased utilization of the metallic sodium. That is, the use of appropriately sized attrition agent and, preferably, one which is capable of undergoing pulverization under the conditions of the reaction, has been found to effect a substantial rise in yield of products from reactions in which metallic sodium in a finely dispersed form is a reactant. Thus, in these reactions, the solid anhydrous magnesium chloride not only functions as the reactant to form the Grignard reagents, but also functions as the solid attrition agent to speed up the rate of the reaction. The products of the initial reaction between the organic halides and metallic sodium are the organic sodio compounds. Presumably, these intermediates react as rapidly as formed with the magnesium chloride present in the reaction mixture.

The magnesium chloride can be added to a pebble mill or ball mill or other type attrition reactor in contact with the dispersed metallic sodium and the hydrocarbon reaction medium wherein the salt is simultaneously ground down to an effective particle size. Or, the magnesium salt can be preground before introduction to the mill and/or before introducing the sodium and other reactant.

Amounts of the magnesium chloride equivalent to at least one mole per mole of the organic halide or, alternatively, of the organic sodio compound are necessary, and generally quite satisfactory, although somewhat larger amounts up to an excess of one mole are more effective to obtain best results by using the magnesium chloride as the attrition agent throughout the entire reaction period.

The reaction temperature throughout the entire process should be held between $-40°$ and $+40°$ C. For compounds in which the organic radical is very reactive, the temperature will be relatively low, while for less reactive compounds, higher temperatures can be employed.

A typical reaction using the process of the invention is carried out by placing an inert hydrocarbon such as isooctane in a suitable vessel with the appropriate amount of sodium metal. The mixture is heated in a surrounding bath or otherwise until the sodium has melted (M. P. $97.5°$ C.). Then a suitable high speed agitator is started and preferably, an emulsifier consisting, for example, of ½% (based on sodium) of the dimer of linoleic acid, is added. After a short period of agitation, a test sample of the dispersion shows the particle size to be in the 5–15 micron range.

The stirring is stopped and the dispersion is allowed to cool to room temperature. This dispersion is now ready to be used in the preparation of the Grignard type compounds from organic halides, sodium, and magnesium chloride. Any such dispersion having sufficiently finely divided sodium will suffice. Other well-known substances may be used instead of the dimeric linoleic acid as the dispersing agents. This sodium dispersion is then added to an inert hydrocarbon which had a temperature controlled within the range of $-40°$ and $+40°$ C. The solid magnesium chloride, in the anhydrous form, is then added to the reaction vessel. The organic halide is also added. A preferred method is to introduce this reactant into the reaction vessel at approximately the same rate as that at which it reacts with the metallic sodium and the magnesium chloride. It is necessary to maintain constant agitation and preferably a grinding action within the reaction mixture.

The Grignard derivatives can either be isolated as such, or they can be directly and immediately thereafter used as chemical intermediates and subjected to further reactions to form valuable derivatives. For instance, subsequent carbonation of the mixture containing these products yields the salts of dicarboxylic acids. The carbonation may be done by subjecting the Grignard derivatives to dry gaseous carbon dioxide, by contact with solid carbon dioxide or by means of a solution of carbon dioxide.

The Grignard compounds formed undergo all typical reactions common to these compounds. They undergo reaction with carbonyl compounds such as aldehydes and ketones to form alcohols. They also react with epoxides to give alcohols. Many other reactions are well known for these materials.

The presence of a carbon to magnesium bond is demonstrated by the reactions of phenylsodium and phenylmagnesium chloride from which the products are well known and easily identified. When phenylsodium is prepared in toluene and the reaction mixture refluxed for two hours after the formation of the phenylsodium is complete, benzylsodium is formed quantitatively. Carbonation give only phenylacetic acid. If carbonation is effected before the reflux period, only benzoic acid is obtained. It is known that Grignard reagents will not effect metalation reactions and thus phenylmagnesium chloride will not metalate toluene to give benzylmagnesium chloride. Accordingly, when chlorobenzene was added to a mixture of metallic sodium and magnesiumchloride in toluene, phenylmagnesium chloride was formed. The reaction mixture was refluxed for two hours and carbonated by pouring over solid carbon dioxide. Only benzoic acid was obtained whereas if benzylsodium were present by a metalation reaction between phenylsodium and toluene, phenylacetic acid would have resulted. Thus, it was shown that the phenylsodium reacted with the magnesium chloride as rapidly as formed to give phenylmagnesium chloride. In a like manner, it has been shown that butylsodium will metalate triphenyl-methane to give triphenylmethylsodium. However, when butyl chloride, sodium and magnesium chloride are reacted together, the product obtained will not metalate triphenylmethane, and therefore it is shown to be the butylmagnesium chloride.

In a similar manner, it can be shown that, during the process described herein, there is a carbon to magnesium bond formed resulting in the Grignard type grouping.

The invention will be described in greater detail by the following examples. These examples and embodiments are illustrative only and the invention is not in any way intended to be limited thereto except as indicated by the appended claims. All parts are expressed as by weight unless otherwise specified.

*Example 1*

Phenylsodium was prepared by slowly adding 112 parts (1 mole) of chlorobenzene in 88.6 parts of toluene to 46 parts (2 g. atoms) of sodium (50% dispersion in isooctane) in 194 parts of toluene at 25° C. Immediately after the addition was complete, the reaction mixture was poured on solid carbon dioxide. Water was added to dissolve the sodium salts and the layers separated. Acidification of the aqueous layer gave 116 parts (96%) of benzoic acid melting at 120–122° C.

*Example 2*

Phenylsodium was prepared by slowly adding 112 parts (1 mole) of chlorobenzene in 88.6 parts of toluene over a one-half hour period to 46 parts (2 g. atoms) of sodium (50% dispersion in isooctane) in 194 parts of toluene. When the addition was complete, the reaction mixture was refluxed for two hours to effect a metalation reaction between the phenylsodium and an equimolar portion of the toluene medium thus forming benzylsodium. Carbonation of the benzylsodium suspension on solid carbon dioxide gave 130 parts (95%) of product identified as phenylacetic acid melting at 72–74° C.

*Example 3*

To a mixture of 23 parts (1 g. atom) of sodium (50% dispersion in isooctane) and 47.5 parts (0.5 mole) of anhydrous magnesium chloride was slowly added 56 parts (0.5 mole) of chlorobenzene in 86.6 parts of toluene. When the addition was complete, the reaction mixture was refluxed for two hours. Carbonation of the reaction mixture on powdered solid carbon dioxide gave 36 parts (59%) of product identified as crude benzoic acid melting as 108–112° C.

*Example 4*

Phenylsodium was prepared by slowly adding 112 parts (1 mole) of chlorobenzene in 88.6 parts of toluene to 46 parts (2 g. atoms) of sodium (50% dispersion in isooctane) in 194 parts of toluene at 25° C. After the addition was complete, 95 parts of anhydrous magnesium chloride was added and the reaction mixture allowed to stir for one hour. The reaction mixture was then poured on solid carbon dioxide. Water was added to dissolve the sodium salts and the layers separated. Acidification of the aqueous layer gave 110 parts (90%) of benzoic acid melting at 120–122° C.

*Example 5*

Butylsodium was prepared by the dropwise addition of 46.3 parts (0.5 mole) of butyl chloride in 63 parts of pentane to 23 parts (1.0 g. atom) of sodium in 205 parts of pentane at 0–5° C. The sodium had been dispersed previous to dilution in an equal weight of isooctane containing 0.05 part of oleic acid as a dispersing agent. The dispersion was transferred to a pebble mill type reactor before dilution and when the subsequent reaction with the butyl chloride was complete, the reaction mixture was allowed to stir for one hour. To this mixture was now added 79 parts (0.33 mole) of triphenylmethane. The resulting metalation reaction was allowed to proceed for 2 hours at room temperature and then poured on an excess of solid carbon dioxide. After acidification, there was obtained a 60% yield of triphenylacetic acid melting at 264–266° C.

*Example 6*

Butylsodium was prepared by the dropwise addition of 46.3 parts (0.5 mole) of butyl chloride in 25 ml. of pentane to 23 parts (1.0 g. atom) of sodium in 325 ml. of pentane. The sodium had been dispersed previous to dilution in an equal weight of isooctane containing 2 drops of oleic acid as a dispersing agent. The dispersion was transferred to a pebble mill type reactor before dilution and subsequent reaction with the butyl chloride. When the addition of the butyl chloride was complete, the reaction mixture was allowed to stir for one hour. To this mixture was added 47 parts of anhydrous magnesium chloride and the resulting mixture ground for one hour. Triphenylmethane (79 parts) was now added and agitation continued for two additional hours. Carbonation of the mixture on solid Dry Ice followed by acidification gave only unreacted triphenylmethane and a 70% yield of valeric acid.

*Example 7*

Butylmagnesium chloride was prepared at 0–5° C. in a pebble mill type reactor by the dropwise addition of 46.3 parts (0.5 mole) of butyl chloride in 63 parts of n-pentane to a mixture of 23 parts (1.0 g. atom) of sodium and 47 parts of anhydrous magnesium chloride. The sodium had been previously dispersed in an equal weight of isooctane before dilution with 205 parts of n-pentane. When the addition of the butyl chloride was complete, the reaction mixture was carbonated on solid carbon dioxide to give an 80% yield of valeric acid.

What is claimed is:

1. The process which comprises preparing a Grignard reagent by reacting an organosodium compound, in which the sodium is directly bonded to carbon, and solid, anhydrous magnesium chloride, in an inert liquid hydrocarbon reaction medium.

2. The process which comprises preparing a chloromagnesium organic compound by reacting a sodiohydrocarbon compound in which the sodium is directly bonded to carbon, and at least a molar equivalent of solid, anhydrous magnesium chloride, in an inert reaction medium containing substantial amounts of an inert liquid hydrocarbon at a temperature in the range of −40° and +40° C.

3. The process which comprises preparing a Grignard reagent by reacting an organic chloride having a chlorine atom directly bonded to carbon, finely dispersed sodium metal, and solid, anyhdrous magnesium chloride, in an inert reaction medium.

4. The process which comprises preparing a chloromagnesium organic compound by reacting a chloride of a hydrocarbon, finely dispersed sodium metal, and at least a molar equivalent of solid, anhydrous magnesium chloride, in an inert reaction medium consisting substantially of a liquid hydrocarbon at a temperature in the range of −40° and +40° C.

5. The process for the formation of a Grignard reagent in an inert hydrocarbon medium which comprises reacting together a chloride of a hydrocarbon, finely dispersed sodium metal having a particle size of from 1 to 15 microns, and solid, anhydrous magnesium chloride, in the presence of an inert reaction medium, in an attrition apparatus and maintaining grinding action therein throughout the entire reaction period.

6. The process for the formation of a Grignard reagent in an inert hydrocarbon medium which comprises reacting together a chloride of a hydrocarbon, finely dispersed sodium metal having a particle size of from 1 to 15 microns, and more than a molar equivalent of solid, anyhdrous magnesium chloride, in the presence of an inert reaction medium consisting substantially of a liquid hydrocarbon at a temperature in the range of −40° and +40° C., in an attrition apparatus and maintaining grinding action therein throughout the entire reaction period.

7. The process for the formation of an alkyl Grignard reagent in an inert hydrocarbon medium which comprises reacting together an alkyl chloride, finely dispersed sodium metal having a particle size of from 1 to 15 microns, and more than a molar equivalent of solid, anhydrous magnesium chloride, in the presence of an inert reaction medium consisting substantially of a liquid hydrocarbon at a temperature in the range of −40° and +40° C., in a ball mill and maintaining grinding action therein throughout the entire reaction period.

8. The process for the formation of an aryl Grignard reagent in an inert hydrocarbon medium which comprises reacting together an aryl chloride, finely dispersed sodium metal having a particle size of from 1 to 15 microns, and more than a molar equivalent of solid, anhydrous magnesium chloride in the presence of an inert reaction medium consisting substantially of a liquid hydrocarbon at a temperature in the range of −40° and +40° C., in a ball mill and maintaining grinding action therein throughout the entire reaction period.

9. The process for the formation of a heterocyclic Grignard reagent in an inert hydrocarbon medium which comprises reacting together a heterocyclic chloride in which a chlorine atom is directly bonded to carbon, finely dispersed sodium metal having a particle size of from 1 to 15 microns, and more than a molar equivalent of solid, anhydrous magnesium chloride, in the presence of an inert reaction medium consisting substantially of a liquid hydrocarbon at a temperature in the range of −40° and +40° C., in a ball mill and maintaining grinding action therein throughout the entire reaction period.

10. The process for the formation of an alkyl Grignard reagent in an inert hydrocarbon medium which comprises reacting together an alkyl sodium compound and solid, anhydrous magnesium chloride, in the presence of an inert reaction medium consisting substantially of a liquid hydrocarbon at a temperature in the range of −40° and +40° C., in a ball mill and maintaining grinding action therein throughout the entire reaction period.

11. The process for the formation of an aryl Grignard reagent in an inert hydrocarbon medium which comprises reacting together an aryl sodium compound and solid anhydrous magnesium chloride, in the presence of an inert reaction medium consisting substantially of a liquid hydrocarbon at a temperature in the range of −40° and +40° C., in a ball mill and maintaining grinding action therein throughout the entire reaction period.

12. The process for the formation of a heterocyclic Grignard reagent in an inert hydrocarbon medium which comprises reacting together a heterocyclic sodium compound in which the sodium atom is directly bonded to carbon and solid, anhydrous magnesium chloride, in the presence of an inert reaction medium consisting substantially of a liquid hydrocarbon at a temperature in the range of −40° and +40° C., in a ball mill and maintaining grinding action therein throughout the entire reaction period.

References Cited in the file of this patent

"Organic Chemistry," Gilman, vol. 1, page 459 (1938), John Wiley & Son, Inc., New York.

"Handling Sodium in Organic Reactions," V. L. Hansley, Ind. & Eng. Chem., August 1951, vol. 43, No. 8, pages 759 to 768.